US012106563B2

(12) United States Patent
Ma

(10) Patent No.: US 12,106,563 B2
(45) Date of Patent: *Oct. 1, 2024

(54) VIDEO CLASSIFICATION METHOD AND SERVER

(71) Applicant: Tencent Technology (Shenzhen) Company Limited, Shenzhen (CN)

(72) Inventor: Lin Ma, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,540

(22) Filed: Jul. 7, 2023

(65) Prior Publication Data
US 2023/0351750 A1    Nov. 2, 2023

Related U.S. Application Data

(63) Continuation of application No. 17/180,510, filed on Feb. 19, 2021, now Pat. No. 11,741,711, which is a
(Continued)

(30) Foreign Application Priority Data

Nov. 29, 2018 (CN) .......................... 201811445857.9

(51) Int. Cl.
*G06V 20/40* (2022.01)
*G06F 18/20* (2023.01)
(Continued)

(52) U.S. Cl.
CPC .............. *G06V 20/41* (2022.01); *G06F 18/24* (2023.01); *G06F 18/29* (2023.01); *G06V 10/454* (2022.01);
(Continued)

(58) Field of Classification Search
CPC ...... G06V 20/41; G06V 10/454; G06V 20/46; G06V 10/82; G06V 10/764; G06F 18/29; G06F 18/24
See application file for complete search history.

(56) References Cited

U.S. PATENT DOCUMENTS 10,334,202 B1 * 6/2019 Zhou ....................... G06N 3/045
2017/0061966 A1 * 3/2017 Marcheret .............. G06V 20/41
(Continued)

FOREIGN PATENT DOCUMENTS

CN      102073631 A      5/2011
CN      102436483 A      5/2012
(Continued)

OTHER PUBLICATIONS

Sunghun Kang et al., "Pivot Correlational Neural Network for Multimodal Video Categorization", Oct. 9, 2018, Advances in Databases and Information Systems, XP047500437, ISBN: 978-3-319-10403-4, 16 pgs.
(Continued)

*Primary Examiner* — Utpal D Shah
(74) *Attorney, Agent, or Firm* — Morgan, Lewis & Bockius LLP

(57) ABSTRACT

This application provides a video classification method, including: obtaining a video comprising a plurality of video frames; obtaining a visual signal feature sequence corresponding to the video using a first submodel in a video classification prediction model, each visual signal feature corresponding to a respective video frame in the video; obtaining an audio signal feature sequence corresponding to the visual signal feature sequence of the video using a second submodel in the video classification prediction model, each audio signal feature corresponding to a respective visual signal feature in the visual signal feature sequence; generating a target signal feature sequence
(Continued)

according to the visual signal feature sequence and the audio signal feature sequence; and predicting a video type of the video based on a classification prediction result obtained from applying the target signal feature sequence to a third submodel in the video classification prediction model.

15 Claims, 5 Drawing Sheets

Related U.S. Application Data continuation of application No. PCT/CN2019/120200, filed on Nov. 22, 2019.

(51) Int. Cl.
*G06F 18/24* (2023.01)
*G06V 10/44* (2022.01)
*G06V 10/764* (2022.01)
*G06V 10/82* (2022.01)
*G10L 25/57* (2013.01)

(52) U.S. Cl.
CPC ............ *G06V 10/764* (2022.01); *G06V 10/82* (2022.01); *G06V 20/46* (2022.01); *G10L 25/57* (2013.01)

(56) References Cited

U.S. PATENT DOCUMENTS

| | | | |
|---|---|---|---|
| 2017/0228618 A1* | 8/2017 | Jiang | ....................... G06F 16/70 |
| 2018/0032846 A1* | 2/2018 | Yang | ..................... G06V 10/811 |
| 2018/0089203 A1 | 3/2018 | Soni et al. | |
| 2018/0332301 A1 | 11/2018 | Tian et al. | |
| 2018/0373985 A1* | 12/2018 | Yang | ....................... G06V 10/82 |
| 2019/0286990 A1* | 9/2019 | Kenney | ................. G06V 10/803 |
| 2019/0384981 A1* | 12/2019 | Swaminathan | ..... G06F 18/2431 |
| 2020/0117887 A1* | 4/2020 | Chaudhuri | .............. G10L 25/78 |
| 2021/0174152 A1 | 6/2021 | Ma | |

FOREIGN PATENT DOCUMENTS

| | | |
|---|---|---|
| CN | 104331442 A | 2/2015 |
| CN | 106503723 A | 3/2017 |
| CN | 107330362 A | 11/2017 |
| CN | 107451148 A | 12/2017 |
| CN | 108307205 A | 7/2018 |
| CN | 109522450 A | 3/2019 |

OTHER PUBLICATIONS

Tencent Technology, Extended European Search Report, EP19888580.8, Dec. 13, 2021, 7 pgs.
Tencent Technology, ISRWO, PCT/CN2019/120200, Feb. 7, 2020, 9 pgs.
Tencent Technology, IPRP, PCT/CN2019/120200, May 25, 2021, 8 pgs.
Tencent Technology (Shenzhen) Company Limited, European Office Action, EP19888580.8, Aug. 23, 2023, 4 pgs.

* cited by examiner

VIDEO CLASSIFICATION METHOD AND SERVER

CROSS REFERENCE TO RELATED APPLICATIONS

This application is a continuation application of U.S. patent application Ser. No. 17/180,510, entitled "VIDEO CLASSIFICATION METHOD, AND SERVER" filed on Feb. 19, 2021, which is a continuation application of PCT Patent Application No. PCT/CN2019/120200, entitled "VIDEO CLASSIFICATION METHOD, AND SERVER" filed on Nov. 22, 2019, which claims priority to Chinese Patent Application No. 201811445857.9, filed with the State Intellectual Property Office of the People's Republic of China on Nov. 29, 2018, and entitled "VIDEO CLASSIFICATION METHOD AND SERVER", all of which are incorporated herein by reference in their entirety.

FIELD OF THE TECHNOLOGY

This application relates to the field of artificial intelligence, and in particular, to a video classification method and a server.

BACKGROUND OF THE APPLICATION

With the rapid development of network multimedia technologies, all kinds of multimedia information come into sight. A growing number of users are accustomed to watching videos on the internet. Videos are generally classified to make it convenient for users to select desired content from a large quantity of videos. Therefore, video classification plays a critical role in video management and interest recommendation.

In the existing video classification method, feature extraction is first performed on each video frame in a to-be-marked video, then frame-level features are transformed into video-level features by using an average feature method, and finally the video-level features are transmitted to a classification network for classification.

However, in the existing video classification method, the transformation of frame-level features based on the average feature method is limited, because the method ignores the impact of changes in other dimensions on the transformation of video frames. As a result, features of video content cannot be well expressed, which is adverse to the accuracy of video classification.

SUMMARY

Embodiments of this application provide a video classification method and a server. During video classification, in the time dimension, not only feature changes of visual features but also feature changes of audio features are taken into account, so that video content can be better expressed, and the accuracy and effect of video classification can be improved.

Therefore, in a first aspect of this application, a video classification method is provided, including:
   obtaining a to-be-processed video, the to-be-processed video including at least one video frame, each video frame corresponding to a time point;
   obtaining a visual signal feature sequence corresponding to the to-be-processed video, the visual signal feature sequence including at least one visual signal feature, each visual signal feature corresponding to a respective video frame at a time point;
   obtaining an audio signal feature sequence corresponding to the visual signal feature sequence, the audio signal feature sequence including at least one audio signal feature, each audio signal feature corresponding to a respective visual signal feature at a time point;
   generating a target signal feature sequence according to the visual signal feature sequence and the audio signal feature sequence; and
   obtaining a classification prediction result corresponding to the target signal feature sequence, the classification prediction result being used for predicting a video type of the to-be-processed video.

In another aspect of this application, a computing device is provided, including:
   an obtaining module, configured to obtain a to-be-processed video, the to-be-processed video comprising at least one video frame, each video frame corresponding to a time point;
   the obtaining module being further configured to obtain a visual signal feature sequence corresponding to the to-be-processed video, the visual signal feature sequence including at least one visual signal feature, each visual signal feature corresponding to a respective video frame at a time point;
   the obtaining module being further configured to obtain an audio signal feature sequence corresponding to the visual signal feature sequence, the audio signal feature sequence including at least one audio signal feature, each audio signal feature corresponding to a respective visual signal feature at a time point;
   a generation module, configured to generate a target signal feature sequence according to the visual signal feature sequence and the audio signal feature sequence that are obtained by the obtaining module;
   the obtaining module being further configured to obtain a classification prediction result that corresponds to the target signal feature sequence and that is generated by the generation module, the classification prediction result being used for predicting a video type of the to-be-processed video.

In a possible design, the obtaining module may be configured to obtain the visual signal feature of the video frame in the to-be-processed video by using a first submodel in a video classification prediction model, the first submodel including a convolutional neural network (CNN) model; and generate the visual signal feature sequence corresponding to the to-be-processed video according to the visual signal feature of the video frame.

In a possible design, the obtaining module may be configured to obtain the audio signal feature of the visual signal feature in the visual signal feature sequence by using a second submodel in the video classification prediction model, the second submodel including a gated-recurrent-unit (GRU)-based recurrent neural model; and generate the audio signal feature sequence corresponding to the visual signal feature sequence according to the audio signal feature of the visual signal feature.

In a possible design, the obtaining module may be configured to obtain a visual signal feature of a first video frame at a first time point and a visual signal hidden state feature of a second video frame at a second time point, the second time point being immediately before the first time point;
   obtain a visual signal hidden state feature of the first video frame at the first time point by using the second submodel, the visual signal hidden state feature of the first video frame at the first time point and the visual signal feature of the first video frame at the first time point corresponding to each other, the visual signal hidden state feature of the first video frame at the first time point and the visual signal hidden state feature of the second video frame at the second time point corresponding to each other;

obtain an audio signal hidden state feature of the second video frame at the second time point;

obtain an audio signal hidden state feature of the first video frame at the first time point by using the second submodel, the audio signal hidden state feature of the first video frame at the first time point and the audio signal hidden state feature of the second video frame at the second time point corresponding to each other, the audio signal hidden state feature of the first video frame at the first time point and the visual signal hidden state feature of the first video frame at the first time point corresponding to each other; and generate an audio signal feature of the first video frame at the first time point according to the audio signal hidden state feature of the first video frame at the first time point.

In a possible design, the obtaining module may be configured to calculate the visual signal hidden state feature of the first video frame at the first time point in the following manner:

$h_t = GRU(x_t, h_{t-1})$ for $t \in [1,T]$ where $h_t$ represents the visual signal hidden state feature of the first video frame at the first time point, GRU( ) represents a gated recurrent unit function, $x_t$ represents the visual signal feature of the first video frame at the first time point, $h_{t-1}$ represents the audio signal hidden state feature of the second video frame at the second time point, t represents the first time point, and T represents a total quantity of time points of the to-be-processed video.

In a possible design, the obtaining module may be configured to calculate the audio signal hidden state feature of the first video frame at the first time point in the following manner:

$y_t = GRU(h_t, y_{t-1})$ for $t \in [1,T]$, where $y_t$ represents the audio signal hidden state feature of the first video frame at the first time point, GRU( ) represents a gated recurrent unit function, $h_t$ represents the visual signal hidden state feature of the first video frame at the first time point, $y_{t-1}$ represents the audio signal hidden state feature of the second video frame at the second time point, t represents the first time point, and T represents the total quantity of time points of the to-be-processed video.

In a possible design, the obtaining module may be configured to calculate the audio signal feature of the first video frame at the first time point in the following manner:

$m_t = FC(y_t)$ for $t \in [1,T]$, where $m_t$ represents the audio signal feature of the first video frame at the first time point, $y_t$ represents the audio signal hidden state feature of the first video frame at the first time point, FC( ) represents a fully-connected network function, t represents the first time point, and T represents the total quantity of time points of the to-be-processed video.

In a possible design, the obtaining module may be configured to obtain an audio-visual signal feature of each target signal feature in the target signal feature sequence by using a third submodel in the video classification prediction model, the third submodel including a GRU-based recurrent neural model;

generate an audio-visual signal feature sequence corresponding to the target signal feature sequence according to the audio-visual signal feature of the target signal feature; and determine the classification prediction result according to the audio-visual signal feature sequence.

In a possible design, the obtaining module may be configured to obtain a target signal feature of the first video frame at the first time point and an audio-visual signal feature of the second video frame at the second time point, the second time point being immediately before the first time point; and obtain an audio-visual signal feature of the first video frame at the first time point by using the third submodel, the audio-visual signal feature of the first video frame at the first time point and the target signal feature of the first video frame at the first time point corresponding to each other, the audio-visual signal feature of the first video frame at the first time point and the audio-visual signal feature of the second video frame at the second time point corresponding to each other.

In a possible design, the obtaining module may be configured to calculate the audio-visual signal feature of the first video frame at the first time point in the following manner:

$H_t = GRU(v_t, H_{t-1})$ for $t \in [1,T]$, and $v_t = [h_t; m_t]$, where $H_t$ represents the audio-visual signal feature of the first video frame at the first time point, GRU( ) represents a gated recurrent unit function, $H_{t-1}$ represents the audio-visual signal feature of the second video frame at the second time point, $v_t$ represents the target signal feature of the first video frame at the first time point, $h_t$ represents the visual signal hidden state feature of the first video frame at the first time point, and $m_t$ represents the audio signal feature of the first video frame at the first time point.

In a possible design, the obtaining module may be configured to calculate the classification prediction result in the following manner:

$$lable = \sum_{n=1}^{N} g_n a_n,$$

$g_n = \sigma_g(W_g H_T + b_g), n \in [1, N]$, and $a_n = \sigma_a(W_a H_T + b_a), n \in [1, N]$, where lable represents the classification prediction result, $g_n$ represents a gate representation function, $a_n$ represents an activation representation function, $W_g$ represent a first matrix of linear transformation parameters, $W_a$ represent a second matrix of linear transformation parameters, $b_g$ represents a first bias parameter vector, $b_a$ represents a second bias parameter vector, $H_T$ represents the audio-visual signal feature sequence, $\sigma_g$ represents a softmax function, $\sigma_a$ represents a sigmoid function, N represents a total quantity of paths obtained after nonlinear transformation, and n represents an $n^{th}$ path obtained after nonlinear transformation.

In still another aspect of this application, a computing device (e.g., a server) is provided. The server is configured to execute the video classification method in the foregoing aspect. Optionally, the server may include a module configured to execute the video classification method in the foregoing aspect.

In a possible design, the computing device may include a processor and a memory, and the memory stores a plurality of instructions that, when executed by the processor, cause the computing device to implement the method in the foregoing aspect.

In yet another aspect of this application, a non-transitory computer-readable storage medium is provided, and the computer-readable storage medium stores a plurality of instructions that, when executed by a processor of a computing device, cause the computing device to implement the method in the foregoing aspects.

In the embodiments of this application, a video classification method and a server are provided. First, the server obtains a to-be-processed video, the to-be-processed video including at least one video frame, each video frame corresponding to a time point. The server obtains a visual signal feature sequence corresponding to the to-be-processed video by using a video classification prediction model and obtains an audio signal feature sequence corresponding to the visual signal feature sequence by using the video classification prediction model. Then the server generates a target signal feature sequence according to the visual signal feature sequence and the audio signal feature sequence. Finally, the server obtains a classification prediction result corresponding to the target signal feature sequence by using the video classification prediction model, where the classification prediction result is used for predicting a video type of the to-be-processed video. According to the foregoing method, during classification of a video, in the time dimension, not only feature changes of visual features but also feature changes of audio features are taken into account, so that video content can be better expressed, and the accuracy and effect of video classification can be improved.

DESCRIPTION OF EMBODIMENTS

Embodiments of this application provide a video classification method and a server. During video classification, in the time dimension, not only feature changes of visual features but also feature changes of audio features are taken into account, so that video content can be better expressed, and the accuracy and effect of video classification can be improved.

The terms "first", "second", "third", "fourth", and the like (if any) in the specification and the claims of this application and the foregoing accompanying drawings are used for distinguishing similar objects, and are not necessarily used for describing a particular sequence or order. It may be understood that the data termed in such a way is interchangeable in proper circumstances, so that the embodiments of this application described herein for example, can be implemented in other orders than the order illustrated or described herein. Moreover, the terms "include", "contain" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, system, product, or device.

This application is mainly used for providing video content classification services. A server performs feature extraction on a video. First, a visual signal feature sequence in the video is obtained, then an audio signal feature sequence is generated by using the visual signal feature sequence, and finally a target signal feature sequence is obtained by integrating the visual signal feature sequence and the audio signal feature sequence. The video is classified according to the target signal feature sequence, so that the server can classify and label the video automatically. This application can also be deployed on a video website to add keywords to videos on the video website, and can also be used for quick search, content matching, and personalized video recommendation.

Figure 1:
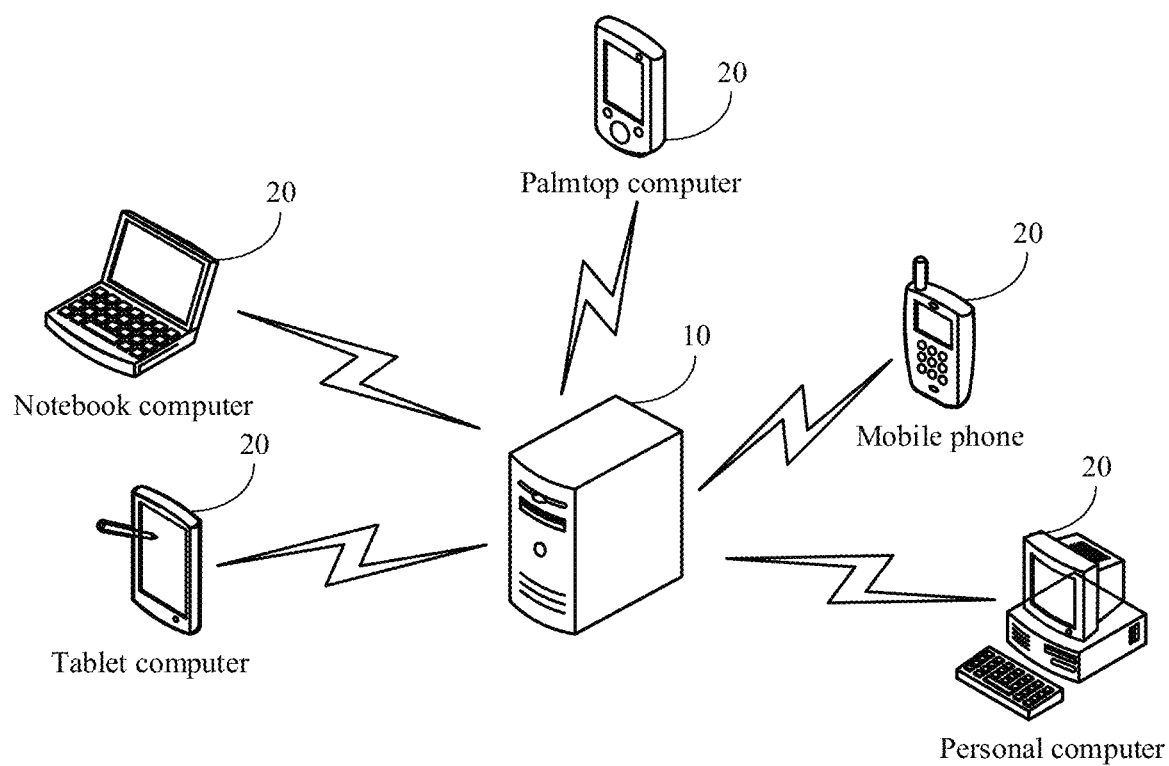
FIG. 1 is a schematic architectural diagram of a video classification system according to an embodiment of this application.

This application provides a video classification method related to artificial intelligence. The method is applicable to a video classification system shown in FIG. 1. FIG. 1 is a schematic architectural diagram of a video classification system according to an embodiment of this application. As shown in FIG. 1, the video classification system may include a server 10 and one or more terminal devices 20. The server 10 obtains videos that need to be classified. The videos may be videos uploaded by a user through a client, or videos stored in advance in a memory of the server 10. Using the solution provided in this application, the server 10 classifies the (one or more) videos, and obtains classification results. Then the server 10 can deliver the classification results of the videos to the client. The client is deployed on the terminal device 20. Referring to FIG. 1, the terminal device 20 includes, but is not limited to, a tablet computer, a notebook computer, a palmtop computer, a mobile phone, and a personal computer (PC), and is not limited herein.

Figure 2:
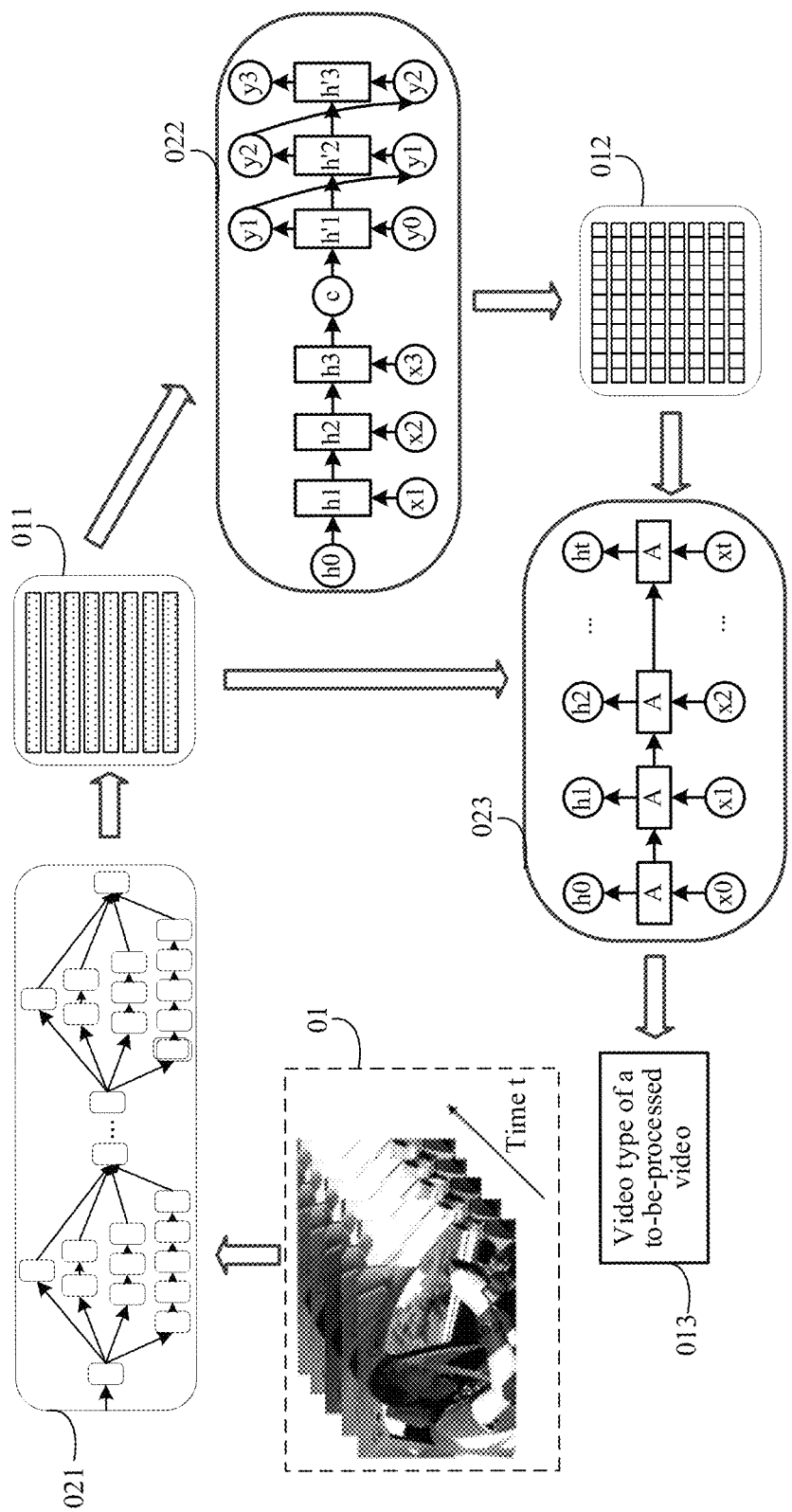
FIG. 2 is a schematic structural diagram of a video classification prediction model according to an embodiment of this application.

For ease of understanding, FIG. 2 is a schematic structural diagram of a video classification prediction model according to an embodiment of this application. As shown in FIG. 2, the server first obtains a to-be-processed video 01. As can be seen from FIG. 2, the to-be-processed video 01 includes a plurality of video frames. Each video frame corresponds to a temporal feature, and different temporal features can be represented by t. Then, the server processes the video frame in the to-be-processed video by using a first submodel 021 in the video classification prediction model, to obtain a visual signal feature 011 corresponding to the video frame. Then, the server processes the visual signal feature 011 corresponding to the video frame in the to-be-processed video by using a second submodel 022 in the video classification prediction model, to predict and obtain an audio signal feature 012 corresponding to the visual signal feature. The visual signal feature 011 and the audio signal feature 012 are combined to obtain a target signal feature. Finally, the server inputs the target signal feature into a third submodel 023 in the video classification prediction model, and obtains a prediction result 013. According to the prediction result 013, a type of the to-be-processed video can be determined, and the to-be-processed video can therefore be classified.

In common video data, users often describe and comment on video information and provide personalized tag data, thus forming rich text information related to online videos. The text information can also be used as the basis for video classification.

Figure 3:
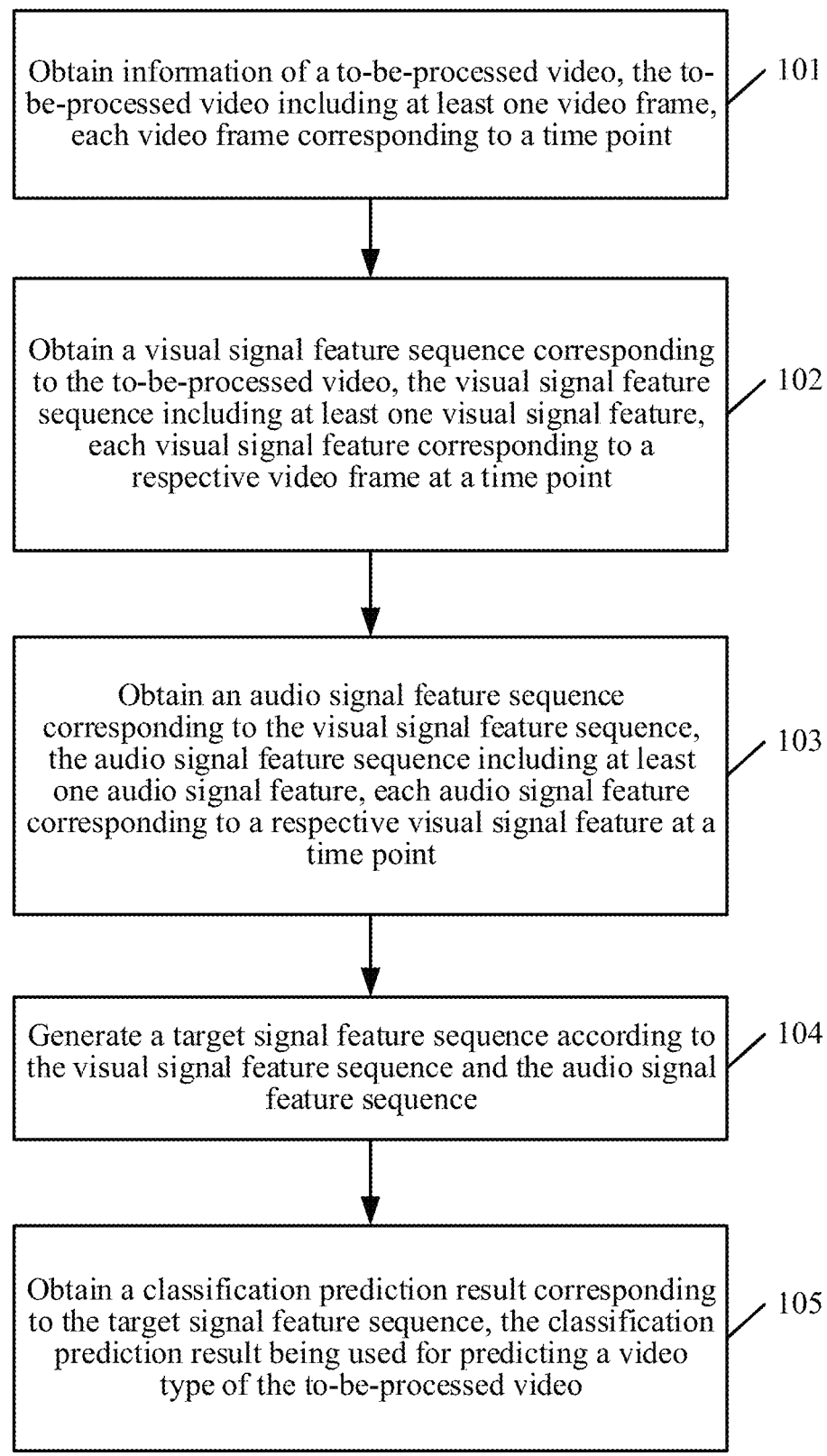
FIG. 3 is a schematic diagram of an embodiment of a video classification method according to this embodiment of this application.

A video classification method according to this application is described below from the perspective of a server. Referring to FIG. 3, an embodiment of the video classification method according to an embodiment of this application includes the following steps.

101: Obtain a to-be-processed video, the to-be-processed video including at least one video frame, each video frame corresponding to a time point.

Figure 4:
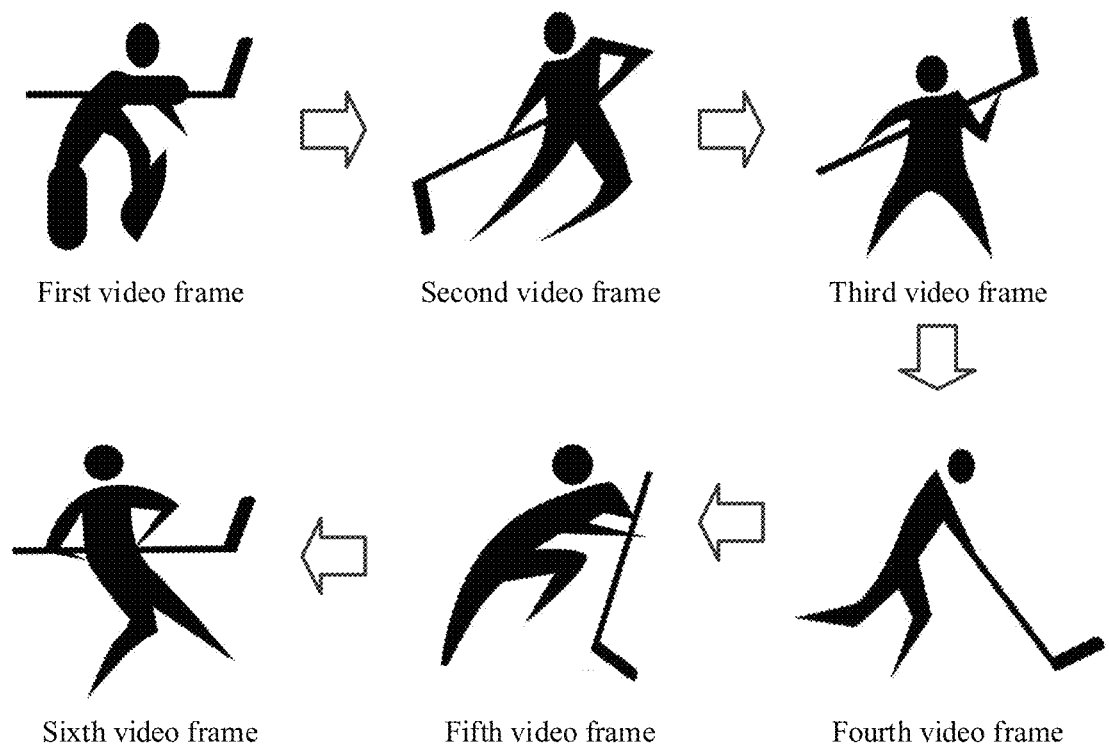
FIG. 4 is a schematic diagram of a to-be-processed video according to an embodiment of this application.

In this embodiment, the server first obtains a to-be-processed video. Optionally, FIG. 4 is a schematic diagram of a to-be-processed video according to this embodiment of this application. As shown in FIG. 4, a to-be-processed video includes a plurality of video frames, and each picture is a video frame. Each video frame corresponds to a time point, and the time point can be represented by a temporal feature. Because the to-be-processed video has a playing time, each video frame has a different playing time point, and a playing time point of a video frame is a time point corresponding to the video frame. Assuming that a temporal feature of the first video frame in the to-be-processed video is "1", then a temporal feature of the second video frame is "2"; the rest can be deduced by analogy, and a temporal feature of a $T^{th}$ video frame is "T".

102: Obtain a visual signal feature sequence corresponding to the to-be-processed video, the visual signal feature sequence including at least one visual signal feature, each visual signal feature corresponding to a time point.

In this embodiment, for a to-be-processed video with a length of T seconds, the to-be-processed video can be inputted to a video classification prediction model, and a visual signal feature sequence corresponding to the to-be-processed video is obtained after the processing of the video classification prediction model. The visual signal feature sequence includes at least one visual signal feature, and each visual signal feature corresponds to a time point. If the T seconds are divided into T time points at intervals of one second, the visual signal feature sequence can be denoted by x, or $x_t$, and $t \in [1,T]$.

103: Obtain an audio signal feature sequence corresponding to the visual signal feature sequence, the audio signal feature sequence including at least one audio signal feature, each audio signal feature corresponding to a time point.

In this embodiment, the visual signal feature sequence with a length of T seconds can be processed by the video classification prediction model, to obtain an audio signal feature sequence corresponding to the visual signal feature sequence. The audio signal feature sequence includes at least one audio signal feature, and each audio signal feature corresponds to a time point. If the T seconds are divided into T time points at intervals of one second, the audio signal feature sequence can be denoted by m, or $m_t$, and $t \in [1,T]$.

104: Generate a target signal feature sequence according to the visual signal feature sequence and the audio signal feature sequence.

In this embodiment, the visual signal feature sequence with a length of T seconds and the audio signal feature sequence with a length of T seconds can be processed by the video classification prediction model continuously, to obtain a target signal feature sequence corresponding to the visual signal feature sequence and the audio signal feature sequence. The target signal feature sequence includes at least one target signal feature, and each target signal feature corresponds to a time point. If the T seconds are divided into T time points at intervals of one second, the target signal feature sequence can be denoted by v, or $v_t$, and $t \in [1,T]$.

105: Obtain a classification prediction result corresponding to the target signal feature sequence, the classification prediction result being used for predicting a video type of the to-be-processed video.

In this embodiment, the server performs modeling based on the target signal feature sequence to obtain a representation of the to-be-processed video, and then the video classification prediction model continues to process the target signal feature sequence to obtain the classification prediction result corresponding to the target signal feature sequence. The video type of the to-be-processed video is predicted by using the classification prediction result.

Optionally, assuming that there are five classification prediction results at most, a code formed by "0" and "1" and having a length of five can be used to represent the classification prediction results. For example, a code corresponding to the classification prediction result of 1 is 00001, a code corresponding to the classification prediction result of 3 is 00100, and the rest is deduced by analogy. If a classification prediction result of a to-be-processed video includes both the classification prediction result 1 and the classification prediction result 3, the classification prediction result of the to-be-processed video can be expressed as 00101.

However, for the whole to-be-processed video, what is obtained through the foregoing steps is the classification prediction result corresponding to the video frame. The classification prediction result can represent the possibility that the to-be-processed video belongs to a particular category. Therefore, each classification prediction result is not greater than one. For example, {0.01, 0.02, 0.9, 0.005, 1.0} is a reasonable classification prediction result, meaning that the probability of the to-be-processed video belonging to the first category is 1.0, that is, 100%; the probability of belonging to the second category is 0.005, that is, 0.5%; the probability of belonging to the third category is 0.9, that is, 90%; the probability of belonging to the fourth category is 0.02, that is, 2%; and the probability of belonging to the fifth category is 0.01, that is, 1%.

After the classification prediction result corresponding to the video frame is obtained, calculation may be performed on the classification prediction results corresponding to the video frames by using preset weight values, so as to determine the video type of the to-be-processed video. The calculation may be conducted by using a weighted sum model, that is, a weighted sum of the classification prediction results corresponding to the video frames may be calculated by using the preset weight values, so as to obtain the classification prediction result of the to-be-processed video. Each weight value is learned through linear regression and is a value representing the importance of each video frame, and the sum of the weight values is 1, for example, {0.1, 0.4, 0.5}. The following illustrates how to obtain the video type of the to-be-processed video through calculation.

It is assumed that the to-be-processed video includes a video frame No. 1, a video frame No. 2, and a video frame No. 3, and weight values of the three video frames are {0.2, 0.3, 0.5}. In addition, a classification prediction result of the video frame No. 1 is {0.01, 0.02, 0.9, 0.005, 1.0}, a classification prediction result of the video frame No. 2 is {0.02, 0.01, 0.9, 0.000 0.9}, and a classification prediction result of the video frame No. 3 is {0.2, 0.3, 0.8, 0.01 0.7}. Then the classification prediction result of the to-be-processed video can be expressed as follows:

0.2×0.01+0.3×0.02+0.5×0.2,0.2×0.02+0.3×0.01+0.5×0.3,0.2×0.9+0.3×0.9+0.5×0.8,0.2×0.005+0.3×0.000+0.5×0.01,0.2×1.0+0.3×0.9+0.5×0.7={0.108,0.157,0.85,0.0075,0.82}.

It can be seen from the result of the formula that, the probability of the to-be-processed video belonging to the third category is the highest, followed by the probability of belonging to the first category. Therefore, the to-be-processed video can be displayed in a video list of the third category first.

The categories of the to-be-processed video may include "sports", "news", "music", "animation", "game", and the like, and are not limited herein.

In the embodiments of this application, a video classification method is provided. First, the server obtains a to-be-processed video, the to-be-processed video including at least one video frame, each video frame corresponding to a time point. The server obtains a visual signal feature sequence corresponding to the to-be-processed video and obtains an audio signal feature sequence corresponding to the visual signal feature sequence. Then the server generates a target signal feature sequence according to the visual signal feature sequence and the audio signal feature sequence. Finally, the server obtains a classification prediction result corresponding to the target signal feature sequence, where the classification prediction result is used for predicting a video type of the to-be-processed video. According to the foregoing method, during classification of a video, in the time dimension, not only feature changes of visual features but also feature changes of audio features are taken into account, so that video content can be better expressed, and the accuracy and effect of video classification can be improved.

Optionally, based on the embodiment corresponding to FIG. 3, in an optional embodiment of the video classification method provided in the embodiments of this application, step 102 of obtaining a visual signal feature sequence corresponding to the to-be-processed video may include the following steps.

Step 1021: Obtain the visual signal feature of the video frame in the to-be-processed video by using a first submodel in a video classification prediction model, the first submodel including a convolutional neural network (CNN) model.

Step 1022: Generate the visual signal feature sequence corresponding to the to-be-processed video according to the visual signal feature of the video frame.

In this embodiment, after obtaining the to-be-processed video, the server inputs each video frame in the to-be-processed video into the first submodel in the video classification prediction model, and then the first submodel outputs the visual signal feature corresponding to the video frame. The visual signal features are used to form the visual signal feature sequence.

The first submodel may be a convolutional neural network (CNN) model with an inception structure. The first submodel processes the video frame in the to-be-processed video, and then extracts an image feature corresponding to the video frame. The image feature is the visual signal feature, where dimensions of the visual signal feature may be 1024. The server generates the visual signal feature sequence of the to-be-processed video according to the visual signal feature of the video frame. Assuming that the first video frame of the to-be-processed video is 1, the second video frame is 2, and so on, and the last video frame is T, it can be determined that a temporal feature sequence of the to-be-processed video is T (seconds).

The inception structure includes three convolutions of different sizes, namely, a 1×1 convolutional layer, a 3×3 convolutional layer, and a 5×5 convolutional layer, and a 3×3 maximum pooling layer is also included. The inception structure removes the last fully connected layer, and uses a global average pooling layer (changing the picture size to 1×1) to replace the fully connected layer.

To enhance network capabilities, the depth and width of the network can be increased. However, to reduce overfitting, free parameters need to be reduced. Therefore, in the same layer of the inception structure, there are three different convolutional templates: a 1×1 convolutional layer, a 3×3 convolutional layer, and a 5×5 convolutional layer. Feature extraction can be performed on the three convolutional templates in different sizes, and this is also a hybrid model. The maximum pooling layer also has the function of feature extraction, and unlike the convolution, the maximum pooling layer has no parameters and thus does not cause overfitting, and therefore can also be used as a branch. However, in this case, the entire network needs a large computing amount, and is not deepened. Therefore, 1×1 convolution is performed before the 3×3 convolution and 5×5 convolution to reduce the quantity of input channels. This deepens the network while reducing the computing amount.

Further, in this embodiment of this application, the server obtains the visual signal feature of the video frame in the to-be-processed video by using the first submodel in the video classification prediction model. The first submodel may be a CNN model, where the visual signal feature sequence corresponding to the to-be-processed video is generated according to the visual signal feature of the video frame. According to the foregoing method, to train and process each video frame by using the CNN helps improve the accuracy of visual signal feature extraction and increase the feasibility and operability of the solution.

Optionally, based on the embodiment corresponding to FIG. 3, in another optional embodiment of the video classification method provided in the embodiments of this application, step 103 of obtaining an audio signal feature sequence corresponding to the visual signal feature sequence may include the following steps.

Step 1031: Obtain the audio signal feature of the visual signal feature in the visual signal feature sequence by using a second submodel in the video classification prediction model, the second submodel including a gated-recurrent-unit (GRU)-based recurrent neural model.

Step 1032: Generate the audio signal feature sequence corresponding to the visual signal feature sequence according to the audio signal feature of the visual signal feature.

In this embodiment, after obtaining the visual signal feature sequence, the server inputs each visual signal feature in the visual signal feature sequence into the second submodel in the video classification prediction model, and then the second submodel outputs the audio signal feature corresponding to the visual signal feature. The audio signal features are used to form the audio signal feature sequence.

The gated recurrent unit (GRU) has a structure similar to that of long short-term memory (LSTM), but in a more simplified manner. Compared with the LSTM, the GRU has a different quantity of gates. The GRU has only two gates, namely, a reset gate and an update gate. In the GRU, the reset gate and the update gate jointly control how to obtain a new hidden state from a previous hidden state through calculation. The GRU omits the output gate in the LSTM.

The GRU has fewer parameters, and therefore achieves a higher training speed, and fewer samples are needed. On the contrary, the LSTM has more parameters, which is more suitable for cases where there is a large quantity of samples, and in such cases, a better model may be obtained.

Further, in this embodiment of this application, the server obtains the audio signal feature of the visual signal feature in the visual signal feature sequence by using the second submodel in the video classification prediction model, where the second submodel includes a GRU-based recurrent neural model. Then the audio signal feature sequence corresponding to the visual signal feature sequence is generated according to the audio signal feature of the visual signal feature. According to the foregoing method, to train and process each visual signal feature by using the GRU helps improve the accuracy of visual signal feature extraction and increase the feasibility and operability of the solution.

Optionally, based on the foregoing embodiments, in still another optional embodiment of the video classification method provided in the embodiments of this application, step 1031 of obtaining the audio signal feature of the visual signal feature in the visual signal feature sequence by using a second submodel in the video classification prediction model may include the following steps.

Step 10311: Obtain a visual signal feature of a first video frame at a first time point and a visual signal hidden state feature of a second video frame at a second time point, the second time point being immediately before the first time point.

Step 10312: Obtain a visual signal hidden state feature of the first video frame at the first time point by using the second submodel, the visual signal hidden state feature of the first video frame at the first time point and the visual signal feature of the first video frame at the first time point corresponding to each other, the visual signal hidden state feature of the first video frame at the first time point and the visual signal hidden state feature of the second video frame at the second time point corresponding to each other.

Step 10313: Obtain an audio signal hidden state feature of the second video frame at the second time point.

Step 10314: Obtain an audio signal hidden state feature of the first video frame at the first time point by using the second submodel, the audio signal hidden state feature of the first video frame at the first time point and the audio signal hidden state feature of the second video frame at the second time point corresponding to each other, the audio signal hidden state feature of the first video frame at the first time point and the visual signal hidden state feature of the first video frame at the first time point corresponding to each other.

Step 10315: Generate an audio signal feature of the first video frame at the first time point according to the audio signal hidden state feature of the first video frame at the first time point.

In this embodiment, the second submodel may include two GRUs, where one GRU is stacked on top of the other GRU, that is, the audio signal hidden state feature outputted by one GRU is used as the input of the other GRU, and finally the audio signal hidden state feature is outputted by one GRU.

Optionally, the following takes a visual signal feature of a particular time point in the whole visual signal feature sequence as an example, and other visual signal features in the visual signal feature sequence are also processed in a similar manner. The server obtains a visual signal feature of a first video frame at a first time point and a visual signal hidden state feature of a second video frame at a second time point, the second time point being immediately before the first time point. Assuming that an interval between two adjacent time points is one second and the first time point is the $2^{rd}$ second, then the second time point is the $1^{st}$ second. In this embodiment, the first time point is expressed as t, the second time point is expressed as t−1, a visual signal feature sequence is expressed as x, and a visual signal feature of the first video frame at the first time point is expressed as $x_t$. By modeling the video frames by using the GRU recurrent neural network, the visual signal hidden state feature of the second video frame at the second time point can be obtained. A visual signal hidden state feature sequence is expressed as h, and the visual signal hidden state feature of the second video frame at the second time point is denoted by $h_{t-1}$. The visual signal feature $x_t$ of the first time point and the visual signal hidden state feature $h_{t-1}$ of the second time point are inputted to the first GRU in the second submodel, and the first GRU outputs the visual signal hidden state feature $h_t$ of the first time point.

Then the audio signal hidden state feature of the second video frame at the second time point is obtained, where an audio signal hidden state feature sequence is expressed as y, and the audio signal hidden state feature of the second video frame at the second time point is denoted by $y_{t-1}$. The audio signal hidden state feature of the second video frame at the second time point $y_{t-1}$ and the visual signal hidden state feature of the first video frame at the first time point $h_t$ are inputted to the second GRU in the second submodel, and the second GRU outputs the audio signal hidden state feature of the first video frame at the first time point $y_t$.

Because the audio signal hidden state feature $y_t$ of the first time point is a representation of the hidden state feature of the recurrent neural network, the audio signal hidden state feature needs to be mapped to be a new vector, which represents the audio signal feature $m_t$ of the first time point.

Further, the embodiments of this application explain how the server obtains the audio signal feature of the visual signal feature in the visual signal feature sequence by using the second submodel in the video classification prediction model. That is, the server obtains the visual signal feature of the first video frame at the first time point and a visual signal hidden state feature of the second video frame at the second time point, and then obtains the visual signal hidden state feature of the first video frame at the first time point by using the second submodel. Next, the server obtains the audio signal hidden state feature of the second video frame at the second time point, and then obtains the audio signal hidden state feature of the first video frame at the first time point by using the second submodel. Finally, the server generates the audio signal feature of the first video frame at the first time point according to the audio signal hidden state feature of the first video frame at the first time point. In the above method, the GRU model can use fewer parameters. Therefore, the training speed is fast, and fewer samples are required, thereby improving the efficiency of classification.

Optionally, based on the foregoing embodiments, in yet another optional embodiment of the video classification method provided in the embodiments of this application, step 10312 of obtaining a visual signal hidden state feature of the first video frame at the first time point by using the second submodel may include:

calculating the visual signal hidden state feature of the first video frame at the first time point in the following manner:

$$h_t = \text{GRU}(x_t, h_{t-1}) \text{ for } t \in [1, T]$$

where $h_t$ represents the visual signal hidden state feature of the first video frame at the first time point, GRU( ) represents a gated recurrent unit function, $x_t$ represents the visual signal feature of the first video frame at the first time point, $h_{t-1}$ represents the audio signal hidden state feature of the second video frame at the second time point, t represents the first time point, and T represents a total quantity of time points of the to-be-processed video.

In this embodiment, the visual signal hidden state feature is calculated by using the following formula:

$$h_t = \text{GRU}(x_t, h_{t-1}) \text{ for } t \in [1,T]$$

where the gated recurrent unit function inputs the visual signal feature $x_t$ of the first time point and the audio signal hidden state feature $h_{t-1}$ of the second time point, and outputs the visual signal hidden state feature $h_t$ of the first time point.

Optionally, the gated recurrent unit function is calculated as follows:

$$h_t = z_t \circ h_{t-1} + (1-z_t) \circ \sigma_h(W_t x_t + U_h(r_t \circ h_{t-1}) + b_h),$$

$$z_t = \sigma_g(W_z x_t + U_z h_{t-1} + b_z), \text{ and}$$

$$r_t = \sigma_g(W_r x_t + U_r h_{t-1} + b_r),$$

where "∘" represents dot multiplication, W and U are both matrices of linear transformation parameters, b is a bias parameter vector, $\sigma_h$ represents an arctan function, and $\sigma_g$ represents a sigmoid function. The subscripts r and z correspond to different gate information, where r corresponds to a reset gate, and z corresponds to an update gate. The subscript h indicates that parameters of the hidden state feature are transformed.

In the embodiments of this application, an optional method for calculating a visual signal hidden state feature is provided, that is, video frames are modeled through the GRU to generate a visual signal hidden state feature sequence. The method provides an optional calculation mode for the implementation of the solution, thereby improving the feasibility and operability of the solution.

Optionally, based on the foregoing embodiments, in still yet another optional embodiment of the video classification method provided in the embodiments of this application, step 10314 of obtaining an audio signal hidden state feature of the first video frame at the first time point by using the second submodel may include:

calculating the audio signal hidden state feature of the first video frame at the first time point in the following manner:

$$y_t = \text{GRU}(h_t, y_{t-1}) \text{ for } t \in [1,T]$$

where $y_t$ represents the audio signal hidden state feature of the first video frame at the first time point, GRU( ) represents a gated recurrent unit function, $h_t$ represents the visual signal hidden state feature of the first video frame at the first time point, $y_{t-1}$ represents the audio signal hidden state feature of the second video frame at the second time point, t represents the first time point, and T represents the total quantity of time points of the to-be-processed video.

In this embodiment, the audio signal hidden state feature is calculated by using the following formula:

$$y_t = \text{GRU}(h_t, y_{t-1}) \text{ for } t \in [1,T],$$

where the visual signal hidden state feature $h_t$ of the first time point and the audio signal hidden state feature $y_{t-1}$ of the second time point are inputted to the gated recurrent unit function, and the gated recurrent unit function outputs the audio signal hidden state feature $y_t$ of the first time point.

Optionally, the gated recurrent unit function is calculated as follows:

$$y_t = z_t \circ y_{t-1} + (1-z_t) \circ \sigma_h(W_t h_t + U_h(r_t \circ y_{t-1}) + b_h),$$

$$z_t = \sigma_g(W_z h_t + U_z y_{t-1} + b_z), \text{ and}$$

$$r_t = \sigma_g(W_r h_t + U_r y_{t-1} + b_r),$$

where W and U are both matrices of linear transformation parameters, b is a bias parameter vector, $\sigma_h$ represents an arctan function, and $\sigma_g$ represents a sigmoid function.

In the embodiments of this application, an optional method for calculating an audio signal hidden state feature is provided, that is, visual signal hidden state features are modeled through the GRU to generate an audio signal hidden state feature sequence. The method provides an optional calculation mode for the implementation of the solution, thereby improving the feasibility and operability of the solution.

Optionally, based on the foregoing embodiments, in another optional embodiment of the video classification method provided in the embodiments of this application, step 10315 of generating an audio signal feature of the first video frame at the first time point according to the audio signal hidden state feature of the first video frame at the first time point may include:

calculating the audio signal feature of the first video frame at the first time point in the following manner:

$$m_t = \text{FC}(y_t) \text{ for } t \in [1,T]$$

where $m_t$ represents the audio signal feature of the first video frame at the first time point, $y_t$ represents the audio signal hidden state feature of the first video frame at the first time point, FC( ) represents a fully-connected network function, t represents the first time point, and T represents the total quantity of time points of the to-be-processed video.

In this embodiment, a fully connected (FC) network is used to map the audio signal hidden state feature to be a new vector, which is used to represent the corresponding audio signal feature.

That is, the audio signal feature is calculated by using the following formula:

$$m_t = \text{FC}(y_t) \text{ for } t \in [1,T].$$

The audio signal hidden state feature $y_t$ of the first time point is inputted to the FC function, and the FC function outputs the audio signal feature $m_t$ of the first time point. The FC layer is used for mapping the learned "distributed feature representation" to a sample label space. In practical use, the FC layers can be implemented by convolution operations, that is, an FC layer that is fully connected to a previous layer can be converted into a convolution with a convolution kernel of 1×1, and an FC layer of which a previous layer is a convolutional layer can be converted into a global convolution with a convolution kernel of h×w, where h and w are the height and width of the previous convolution result respectively.

In the embodiments of this application, an optional method for calculating an audio signal feature is provided, that is, audio signal hidden state features are modeled through the FC layers to generate an audio signal feature sequence. The method provides an optional calculation mode for the implementation of the solution, thereby improving the feasibility and operability of the solution.

Optionally, based on the foregoing embodiments, in another optional embodiment of the video classification method provided in the embodiments of this application, step 105 of obtaining a classification prediction result corresponding to the target signal feature sequence may include:

Step 1051: Obtain an audio-visual signal feature of each target signal feature in the target signal feature sequence by using a third submodel in the video classification prediction model, the third submodel including a GRU-based recurrent neural model.

Step 1052: Generate an audio-visual signal feature sequence corresponding to the target signal feature sequence according to the audio-visual signal feature of the target signal feature.

Step 1053: Determine the classification prediction result according to the audio-visual signal feature sequence.

In this embodiment, after obtaining the target signal feature, the server inputs each target signal feature in the target signal feature sequence into the third submodel in the video classification prediction model, and then the third submodel outputs the audio-visual signal feature corresponding to the target signal feature. The audio-visual signal features are used to form the audio-visual signal feature sequence. The audio-visual signal feature sequence outputted by the third submodel is used as a representation of the whole to-be-processed video. Based on the representation of the to-be-processed video obtained by learning, different classifiers can be used to classify the to-be-processed video, to finally obtain the classification prediction result.

In machine learning, the classifier is used for determining, based on training data labeled with categories, a category to which a new observation sample belongs. The classifier can learn through two ways: unsupervised learning and supervised learning. The unsupervised learning means that samples are given to the classifier for learning, but there is no corresponding category label. This is mainly used to find a hidden structure in unlabeled data. The supervised learning means that a classification function is deduced from labeled training data, and the classification function can be used to map new samples to corresponding labels. In the supervised learning, each training sample includes a training sample feature and a corresponding label. The process of supervised learning includes determining types of training samples, collecting training sample sets, determining an input feature representation of a learning function, determining a structure of the learning function and a corresponding learning algorithm, completing the design of an entire training module, and evaluating accuracy of a classifier.

Further, in this embodiment of this application, the server obtains an audio-visual signal feature of each target signal feature in the target signal feature sequence by using the third submodel in the video classification prediction model, then the server generates the audio-visual signal feature sequence corresponding to the target signal feature sequence according to the audio-visual signal feature of the target signal feature, and finally determines the classification prediction result according to the audio-visual signal feature sequence. The third submodel may be a GRU-based recurrent neural model. According to the foregoing method, to train and process each visual signal feature by using the GRU helps improve the accuracy of visual signal feature extraction and increase the feasibility and operability of the solution.

Optionally, based on the foregoing embodiments, in another optional embodiment of the video classification method provided in the embodiments of this application, step 1051 of obtaining an audio-visual signal feature of each target signal feature in the target signal feature sequence by using a third submodel in the video classification prediction model may include:

Step 10511: Obtain a target signal feature of the first video frame at the first time point and an audio-visual signal feature of the second video frame at the second time point, the second time point being immediately before the first time point.

Step 10512: Obtain an audio-visual signal feature of the first video frame at the first time point by using the third submodel, the audio-visual signal feature of the first video frame at the first time point and the target signal feature of the first video frame at the first time point corresponding to each other, the audio-visual signal feature of the first video frame at the first time point and the audio-visual signal feature of the second video frame at the second time point corresponding to each other.

In this embodiment, the third submodel may include a GRU. A target signal feature of a current time point and an audio-visual signal feature of a previous time point are inputted into the GRU, and then the GRU outputs an audio-visual signal feature of the current time point.

Optionally, the following takes a target signal feature of a particular time point in a target signal feature sequence as an example, and other target signal features in the target signal feature sequence are also processed in an identical manner. The server obtains a target signal feature of the first video frame at the first time point and an audio-visual signal feature of the second video frame at the second time point, the second time point being immediately before the first time point. Assuming the first time point is the $2^{rd}$ second, the second time point is the $1^{st}$ second. In this embodiment, the first time point is expressed as t, the second time point is expressed as t−1, a target signal feature sequence is expressed as v, and a target signal feature of the first video frame at the first time point is expressed as $v_t$. By modeling the target signal features by using the GRU recurrent neural network, the visual signal hidden state feature of the second video frame at the second time point can be obtained. An audio-visual signal feature sequence is expressed as H, and an audio-visual signal feature of the second video frame at the second time point is denoted by $H_{t-1}$. The target signal feature $v_t$ of the first time point and the audio-visual signal feature $H_{t-1}$ of the second time point are inputted to the GRU in the third submodel, and the GRU outputs an audio-visual signal feature $H_t$ of the first time point.

Further, in the embodiments of this application, the server can obtain a target signal feature of the first video frame at the first time point and an audio-visual signal feature of the second video frame at the second time point, and then obtains an audio-visual signal feature of the first video frame at the first time point by using the third submodel, the audio-visual signal feature of the first video frame at the first time point and the target signal feature of the first video frame at the first time point corresponding to each other, the audio-visual signal feature of the first video frame at the first time point and the audio-visual signal feature of the second video frame at the second time point corresponding to each other. According to the foregoing method, to train and process each audio-visual signal feature by using the GRU helps improve the accuracy of audio-visual signal feature extraction and increase the feasibility and operability of the solution.

Optionally, based on the foregoing embodiments, in another optional embodiment of the video classification method provided in the embodiments of this application, step 10512 of obtaining an audio-visual signal feature of the first video frame at the first time point by using the third submodel may include:

calculating the audio-visual signal feature of the first video frame at the first time point in the following manner:

$$H_t = GRU(v_t, H_{t-1}) \text{ for } t \in [1,T], \text{ and}$$

$$v_t = [h_t; m_t],$$

where $H_t$ represents the audio-visual signal feature of the first video frame at the first time point, GRU( ) represents a gated recurrent unit function, $H_{t-1}$ represents the audio-visual signal feature of the second video frame at the second time point, $v_t$ represents the target signal feature of the first video frame at the first time point, $h_t$ represents the visual signal hidden state feature of the first video frame at the first time point, and $m_t$ represents the audio signal feature of the first video frame at the first time point.

In this embodiment, the target signal feature is a combination of the audio signal feature and the visual signal hidden state feature. The visual signal hidden state feature of the first video frame at the first time point is expressed as $h_t$, and the audio signal feature of the first video frame at the first time point is expressed as $m_t$. Therefore, the target signal feature of the first video frame at the first time point is expressed as $v_t = [h_t; m_t]$.

The audio-visual signal feature is calculated by using the following formula:

$$H_t = GRU(v_t, H_{t-1}) \text{ for } t \in [1,T],$$

where the target signal feature $v_t$ of the first time point and the audio-visual signal feature $H_{t-1}$ of the second time point are inputted to the gated recurrent unit function, and the gated recurrent unit function outputs the audio-visual signal feature $H_t$ of the first time point.

Optionally, the gated recurrent unit function is calculated as follows:

$$H_t = z_t \circ H_{t-1} + (1-z_t) \circ \sigma_h(W_v v_t + U_h(r_t \circ H_{t-1}) + b_h),$$

$$z_t = \sigma_g(W_z v_t + U_z H_{t-1} + b_z), \text{ and}$$

$$r_t = \sigma_g(W_r v_t + U_r H_{t-1} + b_r),$$

where W and U are both matrices of linear transformation parameters, b is a bias parameter vector, $\sigma_h$ represents an arctan function, and $\sigma_g$ represents a sigmoid function.

In the embodiments of this application, an optional method for calculating an audio-visual signal feature is provided. That is, a target signal feature is obtained, where the target signal feature is a combination of the visual signal hidden state feature and the audio signal feature that have been generated, and the target signal features are modeled through the GRU to generate the audio-visual signal features. The method provides an optional calculation mode for the implementation of the solution, thereby improving the feasibility and operability of the solution.

Optionally, based on the foregoing embodiments, in another optional embodiment of the video classification method provided in the embodiments of this application, step 1053 of determining the classification prediction result according to the audio-visual signal feature sequence may include:

calculating the classification prediction result in the following manner:

$$lable = \sum_{n=1}^{N} g_n a_n,$$

$$g_n = \sigma_g(W_g H_T + b_g), n \in [1, N], \text{ and}$$

$$a_n = \sigma_a(W_a H_T + b_a), n \in [1, N],$$

where lable represents the classification prediction result, $g_n$ represents a gate representation function, $a_n$ represents an activation representation function, $W_g$ represents a first matrix of linear transformation parameters, $W_a$ represents a second matrix of linear transformation parameters, $b_g$ represents a first bias parameter vector, $b_a$ represents a second bias parameter vector, $H_T$ represents the audio-visual signal feature sequence, $\sigma_g$ represents a softmax function, $\sigma_a$ represents a sigmoid function, N represents a total quantity of paths obtained after nonlinear transformation, n represents the $n^{th}$ path obtained after nonlinear transformation, and n is a positive integer greater than N.

In this embodiment, how to calculate the classification prediction result corresponding to the audio-visual signal feature sequence by using corresponding formulas is illustrated with an example. First, nonlinear transformation is performed on a representation of the audio-visual signal feature sequence to obtain N gate representations and N activation representations, and then row multiplication and addition operations are performed on the two representations, to finally obtain a classification prediction result.

Optional mathematical expressions are as follows:

$$g_n = \sigma_g(W_g H_T + b_g), n \in [1,N], \text{ and}$$

$$a_n = \sigma_a(W_a H_T + b_a), n \in [1,N]$$

A corresponding classification network expression is:

$$lable = \sum_{n=1}^{N} g_n a_n$$

The obtained $g_n$ and $a_n$ are each a vector, lable generally is a probability function, or may be expressed as a vector, and each vector corresponds to probability information of a corresponding category.

Based on the classification prediction result obtained by learning, different classifiers can be used to classify the to-be-processed video. There are many optional classifiers, for example, a mixed expert model or a support vector machine (SVM) model.

Further, in this embodiment of this application, an optional method for obtaining the classification prediction result is introduced, that is, the activation representation function and the gate representation function are used to calculate the classification prediction result together. In the foregoing method, the classification prediction result may be calculated by using related formulas, which provides a feasible way for the implementation of the solution, thereby improving the feasibility and operability of the solution.

Figure 5:
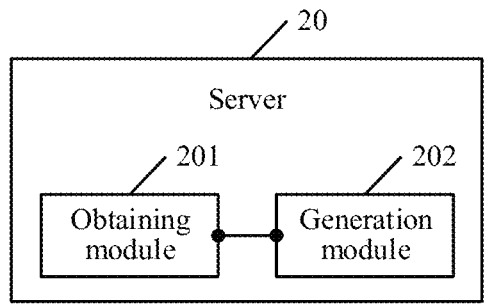
FIG. 5 is a schematic diagram of an embodiment of a server according to an embodiment of this application.

The following describes the server in this application. FIG. 5 a schematic diagram of an embodiment of a server according to an embodiment of this application. The server 20 includes the following modules:

An obtaining module 201 is configured to obtain a to-be-processed video, the to-be-processed video including at least one video frame, each video frame corresponding to a time point.

The obtaining module 201 is further configured to obtain a visual signal feature sequence corresponding to the to-be-processed video, the visual signal feature sequence including at least one visual signal feature, each visual signal feature corresponding to a time point.

The obtaining module 201 is further configured to obtain an audio signal feature sequence corresponding to the visual signal feature sequence, the audio signal feature sequence including at least one audio signal feature, each audio signal feature corresponding to a time point.

A generation module 202 is configured to generate a target signal feature sequence according to the visual signal feature sequence and the audio signal feature sequence that are obtained by the obtaining module 201.

The obtaining module 201 is further configured to obtain a classification prediction result that corresponds to the target signal feature sequence and that is generated by the generation module, the classification prediction result being used for predicting a video type of the to-be-processed video.

In this embodiment, the obtaining module 201 obtains a to-be-processed video, the to-be-processed video including at least one video frame, each video frame corresponding to a time point. The obtaining module 201 obtains a visual signal feature sequence corresponding to the to-be-processed video, the visual signal feature sequence including at least one visual signal feature, each visual signal feature corresponding to a time point. The obtaining module 201 obtains an audio signal feature sequence corresponding to the visual signal feature sequence, the audio signal feature sequence including at least one audio signal feature, each audio signal feature corresponding to a time point. The generation module 202 generates a target signal feature sequence according to the visual signal feature sequence and the audio signal feature sequence that are obtained by the obtaining module 201. The obtaining module 201 obtains a classification prediction result that corresponds to the target signal feature sequence and that is generated by the generation module, the classification prediction result being used for predicting a video type of the to-be-processed video.

In the embodiments of this application, a server is provided. First, the server obtains a to-be-processed video, the to-be-processed video including at least one video frame, each video frame corresponding to a time point. The server obtains a visual signal feature sequence corresponding to the to-be-processed video and obtains an audio signal feature sequence corresponding to the visual signal feature sequence. Then the server generates a target signal feature sequence according to the visual signal feature sequence and the audio signal feature sequence. Finally, the server obtains a classification prediction result corresponding to the target signal feature sequence, where the classification prediction result is used for predicting a video type of the to-be-processed video. According to the foregoing method, during classification of a video, in the time dimension, not only feature changes of visual features but also feature changes of audio features are taken into account, so that video content can be better expressed, and the accuracy and effect of video classification can be improved.

Optionally, based on the embodiment corresponding to FIG. 5, referring to FIG. 5, in another embodiment of the server 20 according to the embodiments of this application, the obtaining module 201 may be configured to obtain the visual signal feature of the video frame in the to-be-processed video by using a first submodel in a video classification prediction model, the first submodel including a convolutional neural network (CNN) model; and generate the visual signal feature sequence corresponding to the to-be-processed video according to the visual signal feature of the video frame.

Further, in this embodiment of this application, the server obtains the visual signal feature of the video frame in the to-be-processed video by using the first submodel in the video classification prediction model. The first submodel may be a CNN model, where the visual signal feature sequence corresponding to the to-be-processed video is generated according to the visual signal feature of the video frame. According to the foregoing method, to train and process each video frame by using the CNN helps improve the accuracy of visual signal feature extraction and increase the feasibility and operability of the solution.

Optionally, based on the embodiment corresponding to FIG. 5, referring to FIG. 5, in another embodiment of the server 20 according to the embodiments of this application, the obtaining module 201 may be configured to obtain the audio signal feature of the visual signal feature in the visual signal feature sequence by using a second submodel in the video classification prediction model, the second submodel including a gated-recurrent-unit (GRU)-based recurrent neural model; and generate the audio signal feature sequence corresponding to the visual signal feature sequence according to the audio signal feature of the visual signal feature.

Further, in this embodiment of this application, the server obtains the audio signal feature of the visual signal feature in the visual signal feature sequence by using the second submodel in the video classification prediction model, where the second submodel includes a GRU-based recurrent neural model. Then the audio signal feature sequence corresponding to the visual signal feature sequence is generated according to the audio signal feature of the visual signal feature. According to the foregoing method, to train and process each visual signal feature by using the GRU helps improve the accuracy of visual signal feature extraction and increase the feasibility and operability of the solution.

Optionally, based on the embodiment corresponding to FIG. 5, referring to FIG. 5, in another embodiment of the server 20 according to the embodiments of this application, the obtaining module 201 may be configured to:

obtain a visual signal feature of a first video frame at a first time point and a visual signal hidden state feature of a second video frame at a second time point, the second time point being immediately before the first time point;

obtain a visual signal hidden state feature of the first video frame at the first time point by using the second submodel, the visual signal hidden state feature of the first video frame at the first time point and the visual signal feature of the first video frame at the first time point corresponding to each other, the visual signal hidden state feature of the first video frame at the first time point and the visual signal hidden state feature of the second video frame at the second time point corresponding to each other;

obtain an audio signal hidden state feature of the second video frame at the second time point;

obtain an audio signal hidden state feature of the first video frame at the first time point by using the second submodel, the audio signal hidden state feature of the first video frame at the first time point and the audio signal hidden state feature of the second video frame at the second time point corresponding to each other, the audio signal hidden state feature of the first video frame at the first time point and the visual signal hidden state feature of the first video frame at the first time point corresponding to each other; and generate an audio signal feature of the first video frame at the first time point according to the audio signal hidden state feature of the first video frame at the first time point.

Further, the embodiments of this application explain how the server obtains the audio signal feature of the visual signal feature in the visual signal feature sequence by using the second submodel in the video classification prediction model. That is, the server obtains the visual signal feature of the first video frame at the first time point and a visual signal hidden state feature of the second video frame at the second time point, and obtains the visual signal hidden state feature of the first video frame at the first time point by using the second submodel. Then, the server obtains the audio signal hidden state feature of the second video frame at the second time point, and then obtains the audio signal hidden state feature of the first video frame at the first time point by using the second submodel. Finally, the server generates the audio signal feature of the first video frame at the first time point according to the audio signal hidden state feature of the first video frame at the first time point. In the above method, the GRU model can use fewer parameters. Therefore, the training speed is fast, and fewer samples are required, thereby improving the efficiency of classification.

Optionally, based on the embodiment corresponding to FIG. 5, referring to FIG. 5, in another embodiment of the server 20 according to the embodiments of this application, the obtaining module 201 may be configured to calculate the visual signal hidden state feature of the first video frame at the first time point in the following manner:

$$h_t = GRU(x_t, h_{t-1}) \text{ for } t \in [1,T],$$

where $h_t$ represents the visual signal hidden state feature of the first video frame at the first time point, GRU( ) represents a gated recurrent unit function, $x_t$ represents the visual signal feature of the first video frame at the first time point, $h_{t-1}$ represents the audio signal hidden state feature of the second video frame at the second time point, t represents the first time point, and T represents a total quantity of time points of the to-be-processed video.

In the embodiments of this application, an optional method for calculating a visual signal hidden state feature is provided, that is, video frames are modeled through the GRU to generate a visual signal hidden state feature sequence. The method provides an optional calculation mode for the implementation of the solution, thereby improving the feasibility and operability of the solution.

Optionally, based on the embodiment corresponding to FIG. 5, referring to FIG. 5, in another embodiment of the server 20 according to the embodiments of this application, the obtaining module 201 may be configured to calculate the audio signal hidden state feature of the first video frame at the first time point in the following manner:

$$y_t = GRU(h_t, y_{t-1}) \text{ for } t \in [1,T],$$

where $y_t$ represents the audio signal hidden state feature of the first video frame at the first time point, GRU( ) represents a gated recurrent unit function, $h_t$ represents the visual signal hidden state feature of the first video frame at the first time point, $y_{t-1}$ represents the audio signal hidden state feature of the second video frame at the second time point, t represents the first time point, and T represents the total quantity of time points of the to-be-processed video.

In the embodiments of this application, an optional method for calculating an audio signal hidden state feature is provided, that is, visual signal hidden state features are modeled through the GRU to generate an audio signal hidden state feature sequence. The method provides an optional calculation mode for the implementation of the solution, thereby improving the feasibility and operability of the solution.

Optionally, based on the embodiment corresponding to FIG. 5, referring to FIG. 5, in another embodiment of the server 20 according to the embodiments of this application, the obtaining module 201 may be configured to calculate the audio signal feature of the first video frame at the first time point in the following manner:

$$m_t = FC(y_t) \text{ for } t \in [1,T],$$

where $m_t$ represents the audio signal feature of the first video frame at the first time point, $y_t$ represents the audio signal hidden state feature of the first video frame at the first time point, FC( ) represents a fully-connected network function, t represents the first time point, and T represents the total quantity of time points of the to-be-processed video.

In the embodiments of this application, an optional method for calculating an audio signal feature is provided, that is, audio signal hidden state features are modeled through the FC layers to generate an audio signal feature sequence. The method provides an optional calculation mode for the implementation of the solution, thereby improving the feasibility and operability of the solution.

Optionally, based on the embodiment corresponding to FIG. 5, referring to FIG. 5, in another embodiment of the server 20 according to the embodiments of this application, the obtaining module 201 may be configured to obtain an audio-visual signal feature of each target signal feature in the target signal feature sequence by using a third submodel in the video classification prediction model, the third submodel including a GRU-based recurrent neural model;

generate an audio-visual signal feature sequence corresponding to the target signal feature sequence according to the audio-visual signal feature of the target signal feature; and determine the classification prediction result according to the audio-visual signal feature sequence.

Further, in this embodiment of this application, the server obtains an audio-visual signal feature of each target signal feature in the target signal feature sequence by using the third submodel in the video classification prediction model, then the server generates the audio-visual signal feature sequence corresponding to the target signal feature sequence according to the audio-visual signal feature of the target signal feature, and finally determines the classification prediction result according to the audio-visual signal feature sequence. The third submodel may be a GRU-based recurrent neural model. According to the foregoing method, to train and process each visual signal feature by using the GRU helps improve the accuracy of visual signal feature extraction and increase the feasibility and operability of the solution.

Optionally, based on the embodiment corresponding to FIG. 5, referring to FIG. 5, in another embodiment of the server 20 according to the embodiments of this application, the obtaining module 201 may be configured to obtain a target signal feature of the first video frame at the first time point and an audio-visual signal feature of the second video frame at the second time point, the second time point being immediately before the first time point; and obtain an audio-visual signal feature of the first video frame at the first time point by using the third submodel, the audio-visual signal feature of the first video frame at the first time point and the target signal feature of the first video frame at the first time point corresponding to each other, the audio-visual signal feature of the first video frame at the first time point and the audio-visual signal feature of the second video frame at the second time point corresponding to each other.

Further, in the embodiments of this application, the server can obtain a target signal feature of the first video frame at the first time point and an audio-visual signal feature of the second video frame at the second time point, and then obtains an audio-visual signal feature of the first video frame at the first time point by using the third submodel, the audio-visual signal feature of the first video frame at the first time point and the target signal feature of the first video frame at the first time point corresponding to each other, the audio-visual signal feature of the first video frame at the first time point and the audio-visual signal feature of the second video frame at the second time point corresponding to each other. According to the foregoing method, to train and process each audio-visual signal feature by using the GRU helps improve the accuracy of audio-visual signal feature extraction and increase the feasibility and operability of the solution.

Optionally, based on the embodiment corresponding to FIG. 5, referring to FIG. 5, in another embodiment of the server 20 according to the embodiments of this application, the obtaining module 201 may be configured to calculate the audio-visual signal feature of the first video frame at the first time point in the following manner:

$$H_t = GRU(v_t, H_{t-1}) \text{ for } t \in [1, T] \text{ and}$$

$$v_t = [h_t; m_t],$$

where $H_t$ represents the audio-visual signal feature of the first video frame at the first time point, GRU( ) represents a gated recurrent unit function, $H_{t-1}$ represents the audio-visual signal feature of the second video frame at the second time point, $v_t$ represents the target signal feature of the first video frame at the first time point, $h_t$ represents the visual signal hidden state feature of the first video frame at the first time point, and $m_t$ represents the audio signal feature of the first video frame at the first time point.

In the embodiments of this application, an optional method for calculating an audio-visual signal feature is provided. That is, a target signal feature is obtained, where the target signal feature is a combination of the visual signal hidden state feature and the audio signal feature that have been generated, and the target signal features are modeled through the GRU to generate the audio-visual signal features. The method provides an optional calculation mode for the implementation of the solution, thereby improving the feasibility and operability of the solution.

Optionally, based on the embodiment corresponding to FIG. 5, referring to FIG. 5, in another embodiment of the server 20 according to the embodiments of this application, the obtaining module 201 may calculate the classification prediction result in the following manner:

$$lable = \sum_{n=1}^{N} g_n a_n,$$

$$g_n = \sigma_g(W_g H_T + b_g), n \in [1, N], \text{ and}$$

$$a_n = \sigma_a(W_a H_T + b_a), n \in [1, N],$$

where lable represents the classification prediction result, $g_n$ represents a gate representation function, $a_n$ represents an activation representation function, $W_g$ represent a first matrix of linear transformation parameters, $W_a$ represent a second matrix of linear transformation parameters, $b_g$ represents a first bias parameter vector, $b_a$ represents a second bias parameter vector, $H_T$ represents the audio-visual signal feature sequence, $\sigma_g$ represents a softmax function, $\sigma_a$ represents a sigmoid function, N represents a total quantity of paths obtained after nonlinear transformation, and n represents an $n^{th}$ path obtained after nonlinear transformation.

Further, in this embodiment of this application, an optional method for obtaining the classification prediction result is introduced, that is, the activation representation function and the gate representation function are used to calculate the classification prediction result together. In the foregoing method, the classification prediction result may be calculated by using related formulas, which provides a feasible way for the implementation of the solution, thereby improving the feasibility and operability of the solution.

Figure 6:
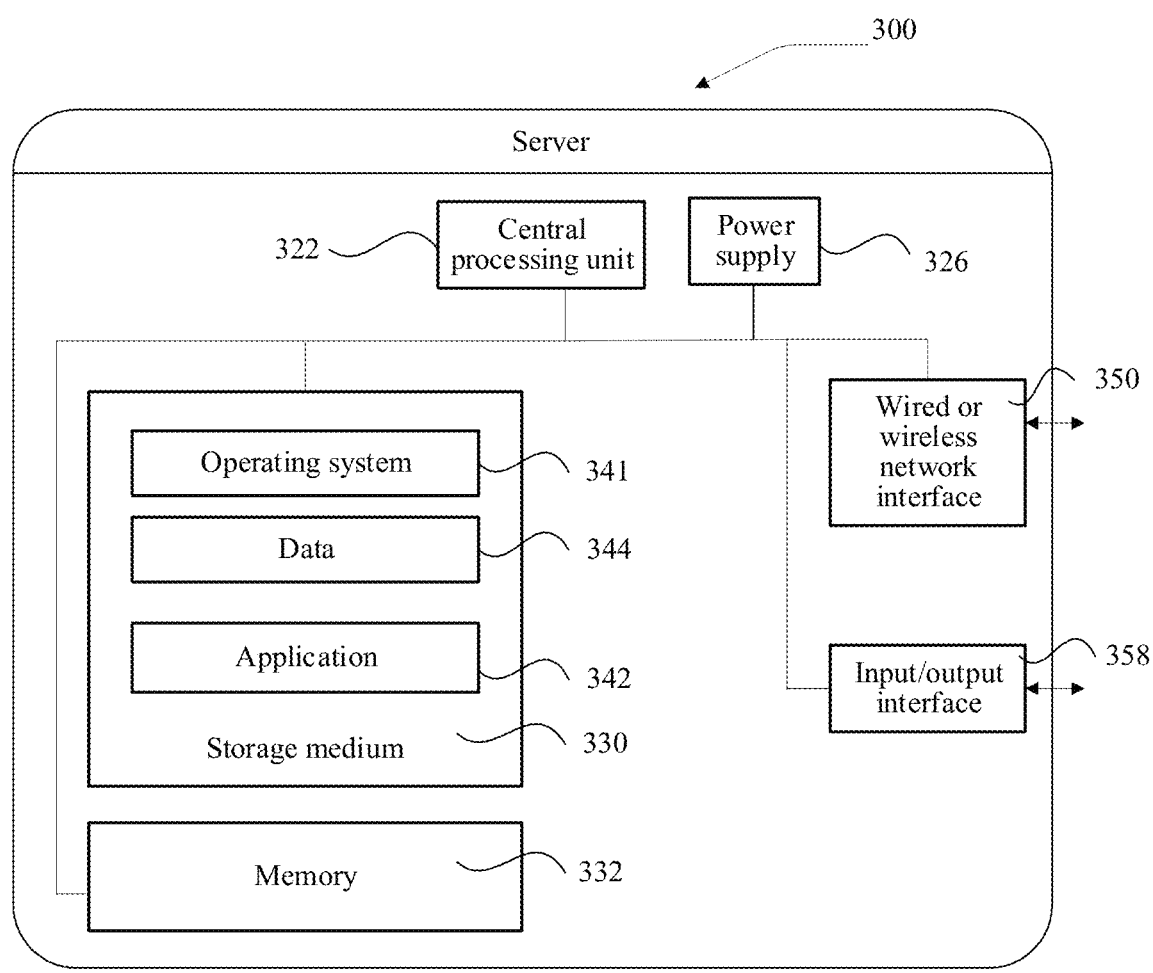
FIG. 6 is a schematic structural diagram of a server according to an embodiment of this application.

FIG. 6 is a schematic structural diagram of a server according to an embodiment of this application. The server 300 may vary greatly due to different configurations or performance, and may include one or more central processing units (CPU) 322 (for example, one or more processors) and a memory 332, and one or more storage medium 330 (for example, one or more mass storage devices) that store application programs 342 or data 344. The memory 332 and the storage medium 330 may be transient or persistent storages. A program stored in the storage medium 330 may include one or more modules (which are not marked in the figure), and each module may include a series of instruction operations on the server. Optionally, the central processing unit 322 may be configured to communicate with the storage medium 330 to perform the series of instruction operations in the storage medium 330 on the server 300.

The server 300 may further include one or more power supplies 326, one or more wired or wireless network interfaces 350, one or more input/output interfaces 358, and/or one or more operating systems 341, for example, Windows Server™, Mac OS X™, Unix™, Linux™, or FreeBSD™.

The step that is in the foregoing embodiment and that is performed by the server may be based on a server structure shown in FIG. 6.

In this embodiment of this application, the CPU 322 is configured to perform the following steps:

obtaining a to-be-processed video, the to-be-processed video including at least one video frame, each video frame corresponding to a time point;

obtaining a visual signal feature sequence corresponding to the to-be-processed video by using the video classification prediction model, the visual signal feature sequence including at least one visual signal feature, each visual signal feature corresponding to a time point;

obtaining an audio signal feature sequence corresponding to the visual signal feature sequence by using the video classification prediction model, the audio signal feature sequence including at least one audio signal feature, each audio signal feature corresponding to a time point;

generating a target signal feature sequence according to the visual signal feature sequence and the audio signal feature sequence; and obtaining a classification prediction result corresponding to the target signal feature sequence by using the video classification prediction model, the classification prediction result being used for predicting a video type of the to-be-processed video.

A person skilled in the art may clearly understand that, for simple and clear description, for optional work processes of the foregoing system, server, and modules, reference may be made to corresponding process in the foregoing method embodiments, and details are not described herein again.

In the embodiments provided in this application, the disclosed system, server, and method may be implemented in other manners. For example, the described server embodiments are merely examples. For example, division of the modules is merely logical function division and there may be other division manners during actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the servers or modules may be implemented in an electronic form, a mechanical form, or another form.

The modules described as separate components may or may not be physically separated, and the components displayed as units may or may not be physical units, i.e., may be located in one place or may be distributed over multiple network units. Some or all of the modules may be selected according to actual needs to achieve the objectives of the solutions of the embodiments.

In addition, functional modules in the embodiments of in this application may be integrated into one processing module, or each of the modules may exist alone physically, or two or more modules are integrated into one module. The integrated module is implemented in the form of hardware, or is implemented in the form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the related art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing embodiments are used for describing, instead of limiting the technical solutions of this application. A person of ordinary skill in the art shall understand that although this application has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of this application.

What is claimed is:

1. A video classification method, comprising:

obtaining a video, the video comprising a plurality of video frames;

obtaining a visual signal feature sequence corresponding to the video using a first submodel in a video classification prediction model, each visual signal feature in the visual signal feature sequence corresponding to a respective video frame in the video;

obtaining an audio signal feature sequence corresponding to the visual signal feature sequence of the video using a second submodel in the video classification prediction model, each audio signal feature in the audio signal feature sequence corresponding to a respective visual signal feature in the visual signal feature sequence;

generating, for the video, a target signal feature sequence according to the visual signal feature sequence and the audio signal feature sequence; and predicting a video type of the video based on a classification prediction result obtained from applying the target signal feature sequence to a third submodel in the video classification prediction model, where the applying the target signal feature sequence to a third submodel in the video classification prediction model comprises:

obtaining an audio-visual signal feature of each target signal feature in the target signal feature sequence by using the third submodel, the third submodel comprising a GRU-based recurrent neural model;

generating an audio-visual signal feature sequence corresponding to the target signal feature sequence according to the audio-visual signal feature of the target signal feature; and determining the classification prediction result according to the audio-visual signal feature sequence.

2. The method according to claim 1, wherein the obtaining a visual signal feature sequence corresponding to the video using a first submodel in a video classification prediction model comprises:

obtaining a visual signal feature of each video frame in the video by using the first submodel, the first submodel comprising a convolutional neural network (CNN) model; and generating the visual signal feature sequence corresponding to the video according to the visual signal features of the of the plurality of video frames.

3. The method according to claim 1, wherein the obtaining an audio signal feature sequence corresponding to the visual signal feature sequence of the video using a second submodel in the video classification prediction model comprises:

obtaining a audio signal feature of each visual signal feature in the visual signal feature sequence by using the second submodel, the second submodel comprising a gated-recurrent-unit (GRU)-based recurrent neural model; and generating the audio signal feature sequence corresponding to the visual signal feature sequence according to the audio signal features of the plurality of visual signal features.

4. The method according to claim 1, wherein the obtaining an audio signal feature sequence corresponding to the visual signal feature sequence of the video using a second submodel in the video classification prediction model comprises:
obtaining an audio signal hidden state feature of a first video frame at a first time point in the video by using the second submodel; and
generating an audio signal feature of the first video frame at the first time point according to the audio signal hidden state feature of the first video frame at the first time point.

5. The method according to claim 1, wherein the obtaining an audio-visual signal feature of each target signal feature in the target signal feature sequence by using the third submodel comprises:
obtaining a target signal feature of the first video frame at the first time point and an audio-visual signal feature of the second video frame at the second time point, the second time point being immediately before the first time point; and
obtaining an audio-visual signal feature of the first video frame at the first time point by using the third submodel, the audio-visual signal feature of the first video frame at the first time point and the target signal feature of the first video frame at the first time point corresponding to each other, the audio-visual signal feature of the first video frame at the first time point and the audio-visual signal feature of the second video frame at the second time point corresponding to each other.

6. A computing device, comprising a memory and a processor;
the memory storing a plurality of instructions that, when executed by the processor, cause the computing device to perform a plurality of operations including:
obtaining a video, the video comprising a plurality of video frames;
obtaining a visual signal feature sequence corresponding to the video using a first submodel in a video classification prediction model, each visual signal feature in the visual signal feature sequence corresponding to a respective video frame in the video;
obtaining an audio signal feature sequence corresponding to the visual signal feature sequence of the video using a second submodel in the video classification prediction model, each audio signal feature in the audio signal feature sequence corresponding to a respective visual signal feature in the visual signal feature sequence;
generating, for the video, a target signal feature sequence according to the visual signal feature sequence and the audio signal feature sequence; and
predicting a video type of the video based on a classification prediction result obtained from applying the target signal feature sequence to a third submodel in the video classification prediction model, where the applying the target signal feature sequence to a third submodel in the video classification prediction model comprises:
obtaining an audio-visual signal feature of each target signal feature in the target signal feature sequence by using the third submodel, the third submodel comprising a GRU-based recurrent neural model;
generating an audio-visual signal feature sequence corresponding to the target signal feature sequence according to the audio-visual signal feature of the target signal feature; and
determining the classification prediction result according to the audio-visual signal feature sequence.

7. The computing device according to claim 6, wherein the obtaining a visual signal feature sequence corresponding to the video using a first submodel in a video classification prediction model comprises:
obtaining a visual signal feature of each video frame in the video by using the first submodel, the first submodel comprising a convolutional neural network (CNN) model; and
generating the visual signal feature sequence corresponding to the video according to the visual signal features of the of the plurality of video frames.

8. The computing device according to claim 6, wherein the obtaining an audio signal feature sequence corresponding to the visual signal feature sequence of the video using a second submodel in the video classification prediction model comprises:
obtaining a audio signal feature of each visual signal feature in the visual signal feature sequence by using the second submodel, the second submodel comprising a gated-recurrent-unit (GRU)-based recurrent neural model; and
generating the audio signal feature sequence corresponding to the visual signal feature sequence according to the audio signal features of the plurality of visual signal features.

9. The computing device according to claim 6, wherein the obtaining an audio signal feature sequence corresponding to the visual signal feature sequence of the video using a second submodel in the video classification prediction model comprises:
obtaining an audio signal hidden state feature of a first video frame at a first time point in the video by using the second submodel; and
generating an audio signal feature of the first video frame at the first time point according to the audio signal hidden state feature of the first video frame at the first time point.

10. The computing device according to claim 6, wherein the obtaining an audio-visual signal feature of each target signal feature in the target signal feature sequence by using the third submodel comprises:
obtaining a target signal feature of the first video frame at the first time point and an audio-visual signal feature of the second video frame at the second time point, the second time point being immediately before the first time point; and
obtaining an audio-visual signal feature of the first video frame at the first time point by using the third submodel, the audio-visual signal feature of the first video frame at the first time point and the target signal feature of the first video frame at the first time point corresponding to each other, the audio-visual signal feature of the first video frame at the first time point and the audio-visual signal feature of the second video frame at the second time point corresponding to each other.

11. A non-transitory computer-readable storage medium, storing a plurality of instructions that, when executed by a processor of a computing device, cause the computing device to perform a plurality of operations including:
obtaining a video, the video comprising a plurality of video frames;

obtaining a visual signal feature sequence corresponding to the video using a first submodel in a video classification prediction model, each visual signal feature in the visual signal feature sequence corresponding to a respective video frame in the video;

obtaining an audio signal feature sequence corresponding to the visual signal feature sequence of the video using a second submodel in the video classification prediction model, each audio signal feature in the audio signal feature sequence corresponding to a respective visual signal feature in the visual signal feature sequence;

generating, for the video, a target signal feature sequence according to the visual signal feature sequence and the audio signal feature sequence; and predicting a video type of the video based on a classification prediction result obtained from applying the target signal feature sequence to a third submodel in the video classification prediction model, where the applying the target signal feature sequence to a third submodel in the video classification prediction model comprises:

obtaining an audio-visual signal feature of each target signal feature in the target signal feature sequence by using the third submodel, the third submodel comprising a GRU-based recurrent neural model:

generating an audio-visual signal feature sequence corresponding to the target signal feature sequence according to the audio-visual signal feature of the target signal feature; and determining the classification prediction result according to the audio-visual signal feature sequence.

12. The non-transitory computer-readable storage medium according to claim 11, wherein the obtaining a visual signal feature sequence corresponding to the video using a first submodel in a video classification prediction model comprises:

obtaining a visual signal feature of each video frame in the video by using the first submodel, the first submodel comprising a convolutional neural network (CNN) model; and generating the visual signal feature sequence corresponding to the video according to the visual signal features of the of the plurality of video frames.

13. The non-transitory computer-readable storage medium according to claim 11, wherein the obtaining an audio signal feature sequence corresponding to the visual signal feature sequence of the video using a second submodel in the video classification prediction model comprises:

obtaining a audio signal feature of each visual signal feature in the visual signal feature sequence by using the second submodel, the second submodel comprising a gated-recurrent-unit (GRU)-based recurrent neural model; and generating the audio signal feature sequence corresponding to the visual signal feature sequence according to the audio signal features of the plurality of visual signal features.

14. The non-transitory computer-readable storage medium according to claim 11, wherein the obtaining an audio signal feature sequence corresponding to the visual signal feature sequence of the video using a second submodel in the video classification prediction model comprises:

obtaining an audio signal hidden state feature of a first video frame at a first time point in the video by using the second submodel; and generating an audio signal feature of the first video frame at the first time point according to the audio signal hidden state feature of the first video frame at the first time point.

15. The non-transitory computer-readable storage medium according to claim 11, wherein the obtaining an audio-visual signal feature of each target signal feature in the target signal feature sequence by using the third submodel comprises:

obtaining a target signal feature of the first video frame at the first time point and an audio-visual signal feature of the second video frame at the second time point, the second time point being immediately before the first time point; and obtaining an audio-visual signal feature of the first video frame at the first time point by using the third submodel, the audio-visual signal feature of the first video frame at the first time point and the target signal feature of the first video frame at the first time point corresponding to each other, the audio-visual signal feature of the first video frame at the first time point and the audio-visual signal feature of the second video frame at the second time point corresponding to each other.

\* \* \* \* \*